United States Patent [19]
Kuhn et al.

[11] Patent Number: 6,119,087
[45] Date of Patent: Sep. 12, 2000

[54] SYSTEM ARCHITECTURE FOR AND METHOD OF VOICE PROCESSING

[75] Inventors: Thomas Murray Kuhn, Menlo Park; Matthew Lennig, Palo Alto; Peter Christopher Monaco, Mountain View; David Bruce Peters, San Carlos, all of Calif.

[73] Assignee: Nuance Communications, Menlo Park, Calif.

[21] Appl. No.: 09/039,203

[22] Filed: Mar. 13, 1998

[51] Int. Cl.[7] .............................. G10L 15/14; G10L 15/22
[52] U.S. Cl. ..................... 704/270; 704/275; 704/256
[58] Field of Search .................................. 704/270, 275, 704/256, 255

[56] References Cited

U.S. PATENT DOCUMENTS

| | | | |
|---|---|---|---|
| 4,887,212 | 12/1989 | Zamora et al. | 364/419 |
| 4,974,191 | 11/1990 | Amirghodsi et al. | 364/900 |
| 5,283,897 | 2/1994 | Goergiadis et al. | 395/650 |
| 5,442,780 | 8/1995 | Takanashi et al. | 395/600 |
| 5,603,031 | 2/1997 | White et al. | 395/683 |
| 5,608,624 | 3/1997 | Luciw | 395/794 |
| 5,937,381 | 8/1999 | Huang et al. | 704/247 |

*Primary Examiner*—David R. Hudspeth
*Assistant Examiner*—Daniel Abebe
*Attorney, Agent, or Firm*—Haverstock & Owens LLP

[57] ABSTRACT

A system and method for efficiently distributing voice call data received from speech recognition servers over a telephone network having a shared processing resource is disclosed. Incoming calls are received from phone lines and assigned grammar types by speech recognition servers. A request for processing the voice call data is sent to a resource manager which monitors the shared processing resource and identifies a preferred processor within the shared resource. The resource manager sends an instruction to the speech recognition server to send the voice call data to a preferred processor for processing. The preferred processor is determined by known processor efficiencies for voice call data having the assigned grammar type of the incoming voice call data and a measure of processor loads. While the system is operating, the resource manger develops and updates a history of each processor. The histories include processing efficiency values for all grammar types received. The processing efficiencies are stored, tabulated and assigned usage number values for each processor. When incoming voice call data is receive, the resource manages evaluates the total sum of the usage numbers for processing requests assigned to each processor and the usage number for the grammar type of the incoming data as applied to each processor. The incoming data is distributed to the processor with the lowest sum of total of usage numbers for assigned requests and the usage number assigned to the incoming data for that processor.

16 Claims, 4 Drawing Sheets

| | | | GRAMMARS | | | | | | TOTAL |
|---|---|---|---|---|---|---|---|---|---|
| • • • | • • • | Numbers String .15-.20 | • • • | • • • | Person Names .4-.45 | • • • | • • • | • • • | |

| | | | | | | | | | |
|---|---|---|---|---|---|---|---|---|---|
| R E C – S E R V E R S | | 0.15 | | | 0.44 | | | | |
| | | 0.17 | | | 0.40 | | | | |
| | | 0.15 | | | 0.42 | | | | |
| | | 0.16 | | | 0.41 | | | | |
| | | 0.20 | | | 0.45 | | | | |
| | | 0.16 | | | n/a | | | | |
| | | 0.18 | | | 0.44 | | | | |
| | | 0.19 | | | 0.41 | | | | |
| | | 0.15 | | | 0.40 | | | | |
| | | 0.15 | | | n/a | | | | |
| | | 0.17 | | | 0.42 | | | | |
| | | 0.18 | | | 0.43 | | | | |
| | | 0.16 | | | 0.45 | | | | |

|   | ... | Numbers String .15-.20 | ... | ... | Person Names .4-.45 | ... | ... | ... |
|---|---|---|---|---|---|---|---|---|
| R | | 0.15 | | | 0.44 | | | |
| E | | 0.17 | | | 0.40 | | | |
| C | | 0.15 | | | 0.42 | | | |
| I | | 0.16 | | | 0.41 | | | |
| S | | 0.20 | | | 0.45 | | | |
| E | | 0.16 | | | n/a | | | |
| R | | 0.18 | | | 0.44 | | | |
| V | | 0.19 | | | 0.41 | | | |
| E | | 0.15 | | | 0.40 | | | |
| R | | 0.15 | | | n/a | | | |
| S | | 0.17 | | | 0.42 | | | |
|   | | 0.18 | | | 0.43 | | | |
|   | | 0.16 | | | 0.45 | | | |

Fig. 4

SYSTEM ARCHITECTURE FOR AND METHOD OF VOICE PROCESSING

FIELD OF THE INVENTION

This invention relates to the field of voice processing. More particularly, this invention relates to an improved architecture having a distributed work allocation control system for a voice processing system.

BACKGROUND OF THE INVENTION

Automated systems for recognizing spoken natural language sequences require varying amount of processing capacity dependent upon the nature of the spoken message. It is well understood that it takes relatively less processor attention to recognize a string of spoken digits than to recognize the spoken name of an individual from among a list of thousands or even hundreds of thousands.

To appreciate this artifact of speech recognition, consider the number of potential words necessary to recite the numbers from zero to 250,000. There are the ten words for single digit numbers: 'one', 'two', 'three'. . . , the ten words for the teen numbers: 'eleven', 'twelve', 'thirteen', . . . , the ten words for the decades: 'ten', 'twenty', 'thirty', . . . , and the two words, for larger place identification 'hundred' and 'thousand'. This relatively limited list of words for speaking a numerical string can result in rather simple or efficient processing of such spoken strings. In contrast, consider a telephone directory having 250,000 names of individuals. Each such name is potentially quite different from one another and can include names such as 'Smith', 'Jones', 'Yamasaki' and 'Van Rysselberghe'. It is clear that the solution for recognizing such a diverse collection of audible sounds can be more difficult than for recognizing a string of numerical digits.

Natural language speech recognition systems are currently in use for responding to various forms of commerce via a telephone network. One example of such a system is utilized in conjunction with a stock brokerage. According to this system, a caller can provide their account number, obtain a quotation for the price of a particular stock issue, purchase or sell a particular number of shares at market price or a predetermined target price among other types of transactions. Natural language systems can also be used to respond to such things as requests for telephone directory assistance.

One conventional approach to handling requests for responses to natural language speech is to establish a FIFO queue. As new requests for service enter the system, each new request is placed into the queue in the order that they were received. As a server for handling a next request completes a task and becomes available for receiving a new task, the oldest pending request is then assigned to that server. This approach does not take into account the capabilities of particular servers.

FIG. 1 shows a conventional system for handling speech utterances received via incoming telephone lines 48. One or more voice processing modules 50 each includes a plurality of Clients 52. Each voice processing module 50 includes a voice processing server 54. The voice processing server 54 for each voice processing module 50 is directly connected to all the Clients 52 in that voice processing module 50. As calls arrive in a system such as shown in this FIG. 1, they are assigned in a round-robin fashion among the various voice processing modules 50 and also round-robin to the Clients 52 with the voice processing modules 50. This prior art system does not account for any variance in use dependent upon system loading, or message type. Such a system can result in a loss of efficiency owing to ineffective work flow assignment.

SUMMARY OF THE INVENTION

A voice processing system receives telephone calls via the central office telephone network on a recognition-client (RecClient). The RecClient is coupled to a speech application system, which among other things determines the grammar-type of a pending utterance. Each pending utterance must ultimately be processed by an operating device (RecServer). The RecClient communicates to a load balancing circuit (resource manager) that there is a pending utterance that needs processing and also identifies the grammar-type. The resource manager continually monitors the overall system to determine the relative loading of the RecServers and also the relative efficiency of each RecServer in handling a particular grammar-type. Based upon the relative loading and relative efficiencies, the resource manager will instruct the RecClient to assign the pending utterance to a particular RecServer.

The adaptive fault tolerant load balancer operates in a distributed system. The load balancer receives notice of a pending operation and determines which one of a plurality of operating devices is capable of performing that pending operation. In addition, the load balancer determines the currently pending loading on those capable operating devices. The load balancer also maintains a data base of relative usage-numbers for each capable operating device. The pending operation is assigned to that one capable operating device having a lowest sum of pending load and relative usage-number.

BRIEF DESCRIPTION OF THE DRAWINGS

FIG. 4 shows the table of FIG. 3 with certain sample data entered therein.

DETAILED DESCRIPTION OF THE PREFERRED EMBODIMENT

Figure 1:
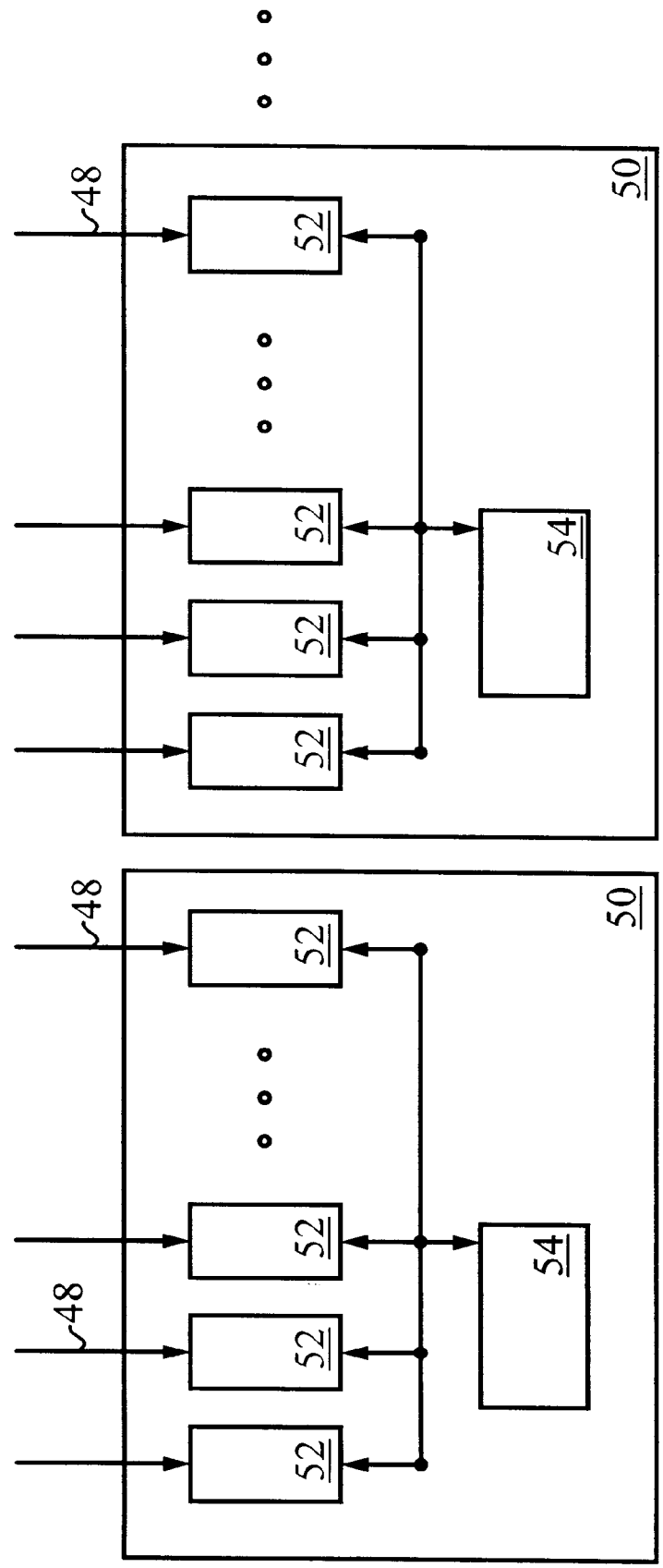
FIG. 1 shows a block diagram of a prior art speech recognition system.
Figure 2:
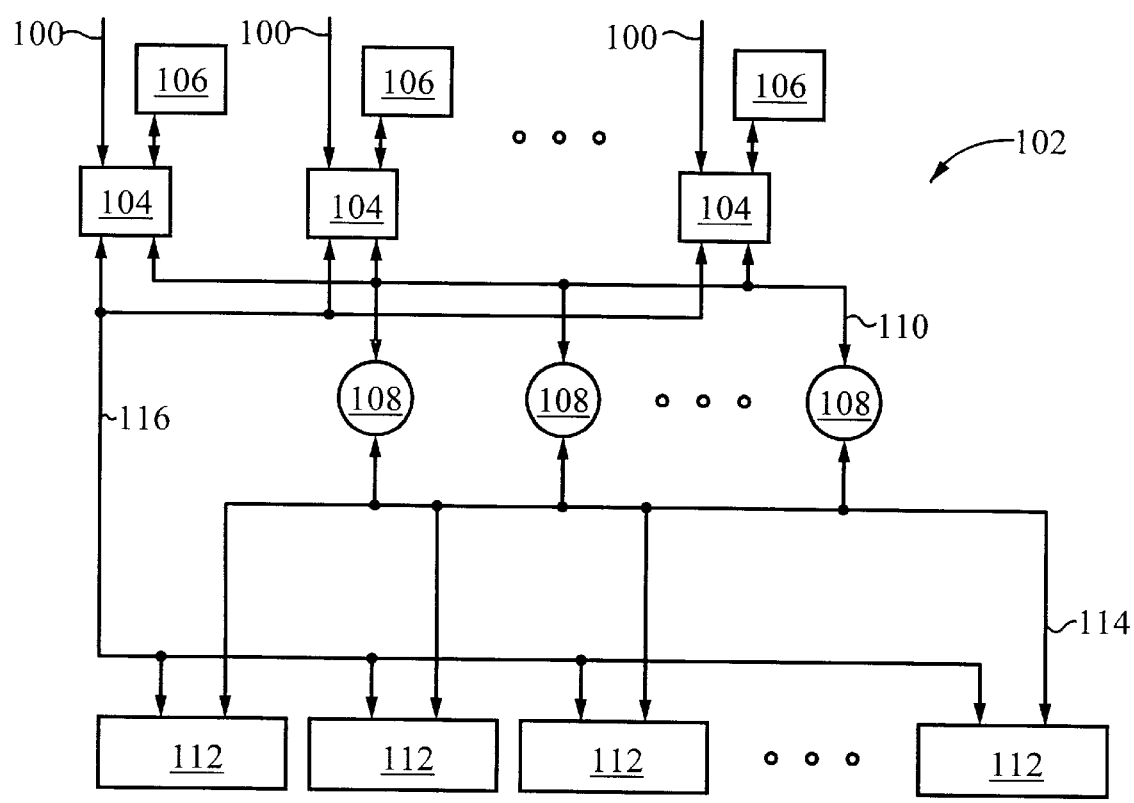
FIG. 2 shows a block diagram of the preferred embodiment of the present invention.

FIG. 2 shows a block diagram of the preferred embodiment of the present invention. The system is adapted to identify and handle a variety of different types of speech calls in an efficient manner.

A telephone line 100 is coupled to provide a user access to the natural language speech recognition system 102 of the present invention. The telephone line 100 is coupled to a RecClient 104. Under certain circumstances, such as shown in FIG. 2, a plurality of RecClients 104 are coupled within the system to allow simultaneous processing of a plurality of calls received over a plurality of telephone lines 100. The RecClient 104 is adapted to perform certain speech preprocessing operations such as determining when a call begins (going off-hook), when a call ends (going on-hook), when speech begins and when speech stops.

A speech application 106 is coupled to the RecClient 104. The speech application 106 controls certain aspects of the operation of the RecClient 104. For example upon determining that a call has begun, the speech application 106 will cause the RecClient 104 to play a user prompt "Welcome to the system." If the speech application 106 detects that the user is speaking while a user prompt is playing, the speech application 106 will instruct the RecClient 104 to stop playing the user prompt. The speech application 106 and the RecClient 104 are configured to cancel echo and noise on the telephone line. These examples are merely exemplary and are ancillary to the present invention. Many other forms of control and response can be exhibited by the speech application 106 and still fall within the spirit and scope of this invention.

The speech application 106 will provide certain audio prompts to a calling user. The prompts are designed to constrain the user into one of several of message types including a simple string of numbers, a person's name, a stock market request, or any other form of predetermined message type. The speech application 106 is configured to expect one of several types of spoken message type. The speech application 106 specifies the user's spoken message type. The speech application 106, provides instructions for further processing to the RecClient(s) 104 depending upon the nature of the message.

At least one resource manager 108 is coupled to each of the RecClients 104. The resource manager 108 monitors the RecClients 104 via a bus 110 to determine the type of speech message coming from each user. Though a bus structure is described here and also below for other interconnections, it will be readily apparent to one of ordinary skill in the art that other types of interconnections can be used, for example direct hard wired connections can be coupled between the various blocks shown in FIG. 2. The RecClient 104 places an appropriate signal on the bus 110 regarding the type of message that needs to be serviced. A plurality of resource managers 108 can be used. Using more than one resource manager 108 can increase the efficiency of the system 102 and also provide redundancy for added system reliability in the event of a failure of a fellow resource manager 108.

A plurality of RecServers 112 are each coupled to all the resource managers 108 to monitor the system loading and the efficiency of each RecServer 112 via a bus 114. The use of monitoring and system loading data will be described in more detail below.

Based upon the type of message and the then current use loading of the system 102, the resource manager 108 sends a control signal via the bus 110 to the RecClient 104 with a currently pending speech message requiring processing. This control signal will assign that RecClient 104 to an appropriate Rec-Server 112. That RecClient 104 and the assigned RecServers 112 communicate via the bus 116 for handling the pending speech utterance. The buses 110, 114 and 116 are each preferably a 100BaseT or ATM-switched ethernet backplane, however any convenient means for communicating this information can be used.

To monitor incoming calls as an aid to properly assigning an incoming natural language voice message to a RecServer 112, the resource managers 108 each develop and maintain a table of information regarding the system 102. The table of information is graphically shown in FIG. 3. The graphical information is representational only, however it is a useful aid to better understanding the invention. The table is a two dimensional array organized in horizontal rows and vertical columns.

Figure 3:
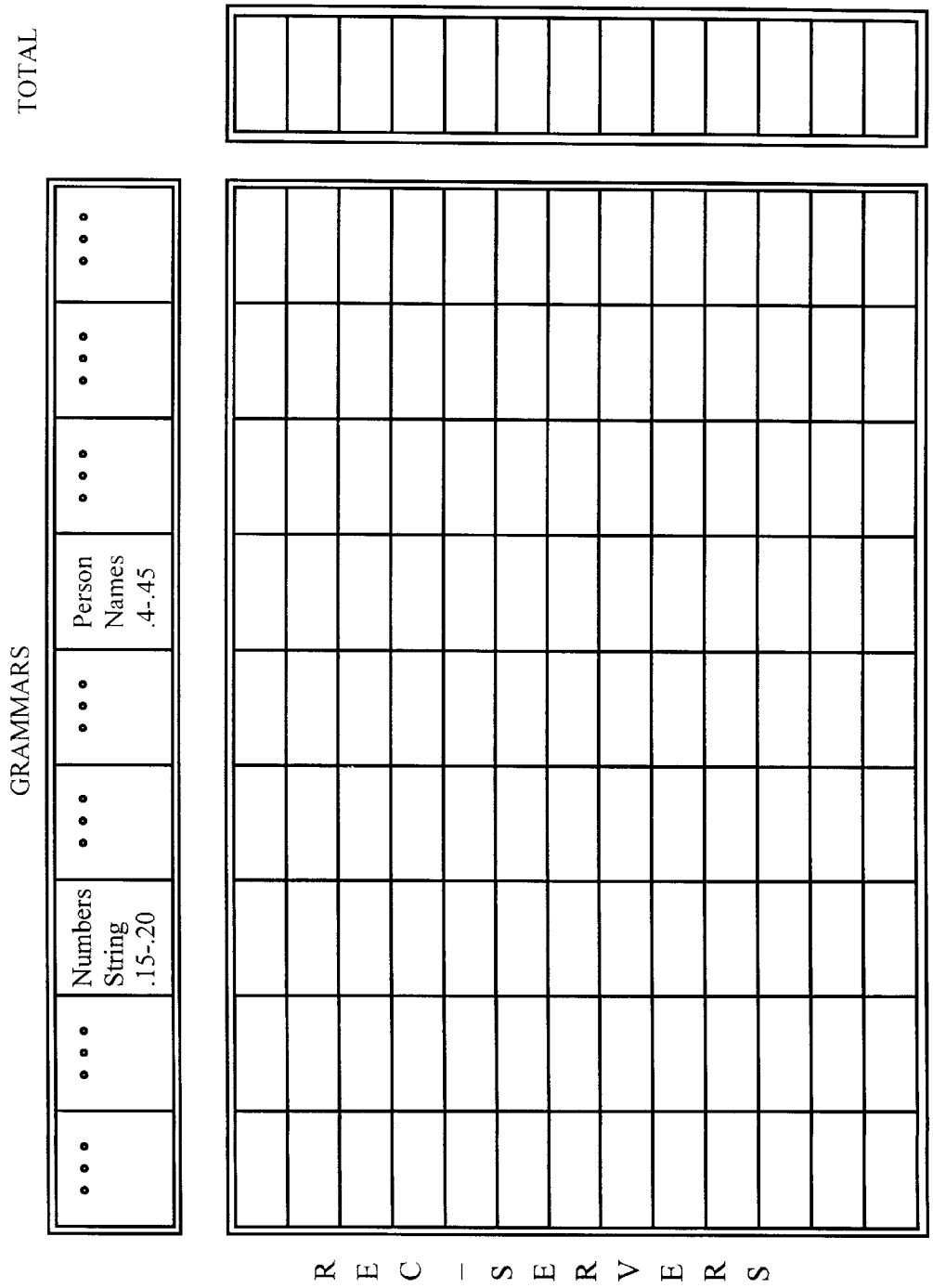
FIG. 3 shows a table used in assignment of utterances for one resource manager in the system of FIG. 2.

In the table of FIG. 3, each row relates to one of the RecServers 112 (FIG. 2). According to the preferred embodiment, the various types of potential speech utterances are called grammars or grammar types. Each grammar relates to one expected speech type, such as a string of numbers, a person's name, a date, a stock quote, and so forth. In addition, the table includes totals column with one totals entry for each one of the RecServers 112, wherein a totals entry represents the total number of usage numbers for all requests assigned to a given Rec-Server.

When a resource manager 108 assigns a grammar to one of the servers, a usage-number for that grammar-type is incremented to the appropriate totals cell in the table. The usage-number is a measure of the percentage of the total processing cycles necessary to service a request of that grammar-type. Each of the RecServers 112 may be configured to handle each grammar-type in a more or less efficient manner so that the usage-numbers are exemplary only. If a particular one of the RecServers 112 has a usage-number of 0.2 for handling a stream of numbers then that RecServer 112 can handle five such calls simultaneously without any loss of efficiency. Another one of the RecServers 112 might have a usage-number of 0.15 for the same type of utterance so that it could handle six such calls and still have some processing capacity available. In this way there are multiple queues, one for each RecServer 112. This is in contrast to the prior art wherein there is a single queue for the entire system.

FIG. 4 shows a further example of the table of FIG. 3 wherein loading factors for two grammars are filled in, namely, grammar type 2 and grammar type 5. It is clear that all the RecServers 112 operate at varying speeds and/or efficiencies for processing requests having the same grammar type. It is also clear that two of the RecServers 112 are not capable of performing the task of recognizing grammar type 5, which can be a person's name. The grammar-types are developed in the table as new RecServers 112 come on-line. Each new RecServer 112 will announce itself to the resource managers 108 and identify the grammar-types it is capable of processing. In this way the table begins completely empty upon powering a system up and fills with data as the resource managers 108 learn what equipment is available in the system 102. In this sense the system 102 is adaptive. Additionally, the system 102 is fault tolerant in the sense that it can survive the loss of one or more (but not all) of the resource managers 108 in that the remaining resource managers 108 are configured to provide load sharing control in the event that one or more of the resource managers 108 fails or shuts down for any reason. Also the system 102 is fault tolerant because it can survive the loss of one or more (but not all) of the RecServers 112. In such a case, the resource managers 108 are configured to not direct any task to such a failed or shut down RecServer 112.

To assign a new speech utterance to one of the RecServers 112 for handling, the system 102 of the present invention operates as follows. First, the RecClient 104 attached to receive the incoming telephone line 100 recognizes that it is off-hook. The speech application 106 specifies the grammar-type of the incoming utterance and so instructs the RecClient 104. That RecClient 104 then advises the resource managers 108 of the pending speech utterance. The resource managers 108 look to the column of usage-numbers in the table which corresponds to the grammar-type of the pending speech utterance and also at the column of totals. The resource managers 108 then advise the RecClient 104 to communicate the pending speech utterance with that one of the RecServers 112 having the smallest sum of the total and usage-numbers. The resource managers 108 then individually update their total numbers with a reservation that presumes the RecClient 104 so advised will connect to the specified RecServer 112. The RecServer 112 so connected will inform the resource managers 108 and the resource managers 108 will move the reservation to the appropriate entry in the table.

It will be understood that an utterance need not and generally does not form a complete telephone call. Rather, a single telephone call can include multiple utterances, each of which is separately handled according to the teachings of this patent document. As the user changes the grammar-type, the RecClient 104 will recognize that utterance as out-of-grammar and will then re-form a new appropriate connection to that one of the RecServers 112 most suitable for serving this grammar-type.

Once the number in the totals column becomes equal to 1.0 for any RecServer 112, that device is then fully loaded. Under certain circumstances, it may be desirable to delay assigning any additional utterances to any one of the RecServers 112 until one or more of the pending utterances is processed to completion. This delay avoids degrading the performance of any one of the RecServers 112 and thereby allows for more efficient operation of the overall system 102. The delay time can be several milliseconds to one-half a second which generally is not even noticeable to a calling user. The time for causing a delay depends upon a threshold value in the totals column. The thresholds vary upon the grammar-type of the pending utterance.

Once the task is assigned to and accepted by one of the RecServers 112, the reservation that the resource managers 108 had assigned to that particular task is confirmed in, or moved to the appropriate totals entry. Upon completion of the task, the value in the totals column for that RecServer 112 is similarly decremented by that amount of the appropriate usage-number. In this way the available capacity for all the RecServers 112 is readily known by the resource managers 108.

Upon completion of the handling of a particular grammar-type of speech utterance, the responding RecServer 112 advises the resource managers 108 of the then current usage-number for handling that grammar-type and the resource managers 108 will update their tables. In this way, the tables reflect the actual operating efficiency of the entire system 102.

As an example, consider that a table reflects a usage-number of 0.20 for streams of numbers. If the system 102 assigns two such streams of numbers to that RecServer 112 then the value in the totals column corresponding to that RecServer 112 is equal to 0.40. If one of those streams of numbers is completed processing and the usage-number for that grammar-type is decreased to 0.15 as a result, once the other utterance is fully processed, the entry in the totals column corresponding to the RecServers 112 would be 0.05. To solve this problem, a reservation-number is associated with the totals column and contains the actual usage-number assignment value for all currently processed utterances. Upon completion of processing each utterance, it is this stored reservation-number that is subtracted from the totals number rather than the usage-number currently stored in the table. In this way, the number in the totals column can return to zero when the RecServer 112 is no longer processing any utterances.

The latency attributable to the resource manager 108 advising the RecClient 104 with which one of the RecServers 112 to communicate is merely 2.5 mS. The operation of updating the tables is performed outside of the operation of processing an utterance and thus does not impact latency of the system 102.

Each one of the resource managers 108 maintains their own tables. All the resource managers 108 observe essentially the same data from the system 102 so that all the tables should be the same. Each RecClient 104 recognizes one of the resource managers 108 as a master. If two of the resource managers 108 direct a RecClient 104 to a different one of the RecServers 112, the RecClient 104 will honor the assignment made by its master. Notwithstanding, all resource managers 108 are observing the same data and thus have the same table data once an assignment is made.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A system architecture for efficiently distributing voice call data over a telephone network using speech recognition, the system architecture comprising:
   a) a first circuit for receiving incoming voice call data from a call, wherein the first circuit recognizes a grammar-type of the call;
   b) a plurality of processing circuits configured to process the voice call data;
   c) a load balancing circuit coupled each of the first circuit and the plurality of processing circuits for distributing the voice call data to a preferred processor circuit within the plurality of processors, wherein the preferred processor circuit is selected by the load balance circuit using criteria comprising the assigned grammar type and known processor efficiencies for each processor circuit for processing previously received voice call data having a same grammar type as the call.

2. The system architecture of claim 1, wherein the first circuit submits a processing request to the load balancing circuit when the call is received, the load balance circuit identifies the preferred processor to the first circuit and the first circuit transfers the voice call data to the preferred processor circuit for processing.

3. The system architecture of claim 1, wherein the known processor efficiencies are determined from stored histories for each of the processor circuits for processing the voice call data from calls relative to each grammar type.

4. The system architecture of claim 3, wherein each processor is assigned a usage number indicative of its processing efficiencies for the type and wherein the usage numbers are tabulated and stored by the load balancing circuit.

5. The system architecture of claim 4 wherein the load balancing circuit measures a load number for each processing circuit, wherein the value of the load number indicative of a total sum of usage number for each call assigned to each processor circuit.

6. The system architecture of claim 5, wherein load numbers are tabulated and stored by the load balancing circuit.

7. The system architecture of claim 6, wherein the load balancing circuit identifies the preferred processor circuit by comparing the usage numbers and the load numbers for each processor circuit.

8. A system for efficiently distributing data over a telephone network using speech recognition, the system comprising:

a) a voice recognition unit capable of receiving call data and assigning the voice call data a grammar type;

b) a processing resource coupled to the voice recognition device for processing the voice call data, the processing resource comprising a plurality of processors;

c) a resource managing unit coupled to the voice recognition device and the processing resource, wherein the resource manager measures load numbers indicative of a number of processing requests issued each of the plurality of processors, wherein the resource managing unit is capable of storing processor histories for each processor within the plurality of processors and based on the processor histories and the load numbers directs the voice call data to a preferred processor within the plurality processors.

9. The system of claim 8 wherein the processing resource is coupled to the voice recognition unit and the resource manager unit is coupled to the processing resource and the voice recognition unit through bus systems.

10. The system of claim 9, wherein the bus systems comprise a bus selected from the group consisting of a 100-BaseX bus and a ATM-switched ethernet backplane bus.

11. The system of claim 9, wherein the voice recognition unit is in communication with the each processors through the bus system and wherein the voice call data is directed to the performed processor through the voice recognition unit initiated by a signal from the resource manager unit.

12. A method for distributing call data over a telephone network with a plurality of processing stations, the method comprising the steps of:

a) receiving voice call data from calls;

b) assigning a grammar type from a set of grammar types for each call received;

c) collecting processor histories for each processor within the plurality of processor, wherein the processor histories include processor efficiencies for processing each grammar type within the set of grammar types;

d) measuring loads of the each processor obtain a load numbers;

e) distributing calls to a processing stations within the plurality of processing stations most capable to process calls based load numbers and processing efficiencies.

13. The method of claim 12, wherein the each processor station is assigned a usage number for the each grammar type, wherein the usage number is a measure of time the each processor is required to process its associated grammar type.

14. The method of claim 13, wherein the step of measuring loads of the each processor comprises the step of summing all the usage numbers assigned to the each processor.

15. The method of claim 14, wherein the voice call data is distributed to a processor within the plurality of processors with the smallest summed value of the usage number for the call received and the load number at the time the call is received.

16. An adaptive system for efficiently distributing data over a telephone network using speech recognition, the system comprising a) means for receiving an incoming voice instructions and identifying a grammar type of the incoming voice instructions;

b) means for issuing a processing request to have the incoming voice instructions processes;

c) a set of processors c) a means to identify a processor from the set of processors which is most capable of processing the request with the grammar type; and d) a means to direct the voice instruction to the processor.

* * * * *